United States Patent
Sharifipour et al.

(10) Patent No.: US 11,032,895 B1
(45) Date of Patent: Jun. 8, 2021

(54) WIRELESS LIGHT SWITCH WITH ENERGY MANAGEMENT CONTROL

(71) Applicants: Bahman Sharifipour, Newington, NH (US); Jumie Yuventi, Sacramento, CA (US); Gary Fong, Menlo Park, CA (US)

(72) Inventors: Bahman Sharifipour, Newington, NH (US); Jumie Yuventi, Sacramento, CA (US); Gary Fong, Menlo Park, CA (US)

(73) Assignee: Katerra Inc., Menlo Park, CA (US)

( * ) Notice: Subject to any disclaimer, the term of this patent is extended or adjusted under 35 U.S.C. 154(b) by 0 days.

(21) Appl. No.: 16/702,293

(22) Filed: Dec. 3, 2019

Related U.S. Application Data

(60) Provisional application No. 62/774,732, filed on Dec. 3, 2018.

(51) Int. Cl.
| | |
|---|---|
| *H05B 47/17* | (2020.01) |
| *H05B 47/19* | (2020.01) |
| *H05B 47/115* | (2020.01) |
| *H02S 40/38* | (2014.01) |
| *H05B 47/11* | (2020.01) |

(52) U.S. Cl.
CPC .......... *H05B 47/19* (2020.01); *H02S 40/38* (2014.12); *H05B 47/11* (2020.01); *H05B 47/115* (2020.01); *H05B 47/17* (2020.01)

(58) Field of Classification Search
CPC .......... H05B 37/0227; H05B 37/0245; H05B 37/0272; H05B 47/17; H05B 47/175; H05B 47/19; H05B 47/195

USPC .................................................. 315/308, 312
See application file for complete search history.

(56) References Cited

U.S. PATENT DOCUMENTS

| | | | |
|---|---|---|---|
| 5,458,311 A * | 10/1995 | Holbrook | H05B 47/10 248/309.1 |
| 6,371,637 B1 | 4/2002 | Atchinson | |
| 8,664,881 B2 * | 3/2014 | Newman, Jr. | H05B 47/10 315/291 |
| 10,716,192 B1 * | 7/2020 | Tsibulevskiy | H02J 9/061 |

(Continued)

FOREIGN PATENT DOCUMENTS

| | | |
|---|---|---|
| CN | 104465638 | 3/2015 |

OTHER PUBLICATIONS

Non-Final Office Action dated Feb. 25, 2020, U.S. Appl. No. 16/250,727, filed Jan. 17, 2019, applicant: Juntao Zhang, 21 pages.

(Continued)

*Primary Examiner* — Tung X Le
(74) *Attorney, Agent, or Firm* — Haverstock&Owens LLP

(57) ABSTRACT

A wireless light switch harvests energy for ambient environment/space conditions and uses the harvested energy to energize low-power electronics. An exemplary application is for wireless control (ON/OFF or dimming) of light fixtures. The energy harvesting circuitry transduces ambient light to electricity and uses this energy to charge an energy storage device as well as power a wireless transmitter which can be triggered based on user interaction with an ON/OFF or Dim+/Dim− element. The wireless light switch with energy harvesting circuitry is paired with a wireless receiver circuit which can be connected to a light fixture that is to be controlled by the wireless light switch.

28 Claims, 3 Drawing Sheets

(56) References Cited

U.S. PATENT DOCUMENTS

| | | |
|---|---|---|
| 2004/0007981 A1 | 1/2004 | Shibata |
| 2010/0141153 A1 | 6/2010 | Recker |
| 2011/0227489 A1 | 9/2011 | Huynh |
| 2012/0162965 A1 | 6/2012 | Takeuchi |
| 2012/0299489 A1 | 11/2012 | Sakuragi |
| 2014/0175996 A1 | 6/2014 | Yoon |
| 2015/0043212 A1 | 2/2015 | Coffey |
| 2015/0189726 A1* | 7/2015 | Spira .............. H05B 47/105 315/302 |
| 2016/0034137 A1 | 2/2016 | Foster et al. |
| 2016/0315474 A1* | 10/2016 | Satake .............. H02J 3/50 |
| 2017/0125875 A1* | 5/2017 | Courtney .......... H01Q 1/38 |
| 2017/0138542 A1 | 5/2017 | Gielen |
| 2017/0279297 A1* | 9/2017 | Gao .................. H02J 7/35 |
| 2018/0363893 A1 | 12/2018 | Cheng |
| 2019/0120438 A1 | 4/2019 | Wan |
| 2019/0166661 A1 | 5/2019 | Gao |

OTHER PUBLICATIONS

Notice of Allowance dated Jun. 11, 2019, U.S. Appl. No. 16/197,003, filed Jan. 20, 2018, Applicant: Shanfu Gao, 15 pages.

* cited by examiner

WIRELESS LIGHT SWITCH WITH ENERGY MANAGEMENT CONTROL

RELATED APPLICATIONS

This patent application claims priority under 35 U.S.C. 119(e) of the U.S. provisional patent application, Application Ser. No. 62/774,732, filed on Dec. 3, 2018, and entitled "Wireless Light Switch with Energy Management Control", which is hereby incorporated in its entirety by reference.

FIELD OF THE INVENTION

The present invention is generally directed to light switches. More specifically, the present invention is directed to wireless light switches with energy management control.

BACKGROUND OF THE INVENTION

There are conventional occupancy sensors that use photovoltaic cells to harvest energy from ambient light in a room and use the harvested energy to power the occupancy sensor.

However, such conventional occupancy sensors do not provide additional functionality such as included control circuitry for generating and wirelessly transmitting control signals to a light fixture.

Conventional light switches provide a point for turning ON or OFF a connected light fixture. The light fixture is connected to main power either directly or via a power outlet into which the light fixture is plugged in. The light switch provides a mechanical point of connection for opening or closing the circuit between the light fixture and main power. In this sense, such light switches are considered to provide wired control of the light fixture since the light switch is wired to the light fixture. Wireless light switches enable a light switch to provide control of a light fixture without having a physical wired connection. However, such wireless light switches are typically connected to main power to meet their power needs. There are also conventional wireless switches that use kinetic energy to power the transmission of a control signal from the wireless switch to the light fixture. A kinetic energy harvesting mechanism is typically a spring or slide that is located within the switch itself. When the switch is physically pushed, the switch is moved from the OFF to ON position, a physical displacement of the switch is made. This physical movement is translated into mechanical energy and is then translated into electrical energy, such as by a piezoelectric element, which is stored or used as energy. Such kinetic energy switches are often unreliable as having physical parts that may degrade or break down. Kinetic energy switches also require the switch to be physically moved, i.e. turned ON or OFF, in order to harvest kinetic energy. If the switch is not moved, no kinetic energy can be harvested.

SUMMARY OF THE INVENTION

A wireless light switch harvests energy from ambient environment/space conditions and uses the harvested energy to energize low-power electronics. An exemplary application is for wireless control (ON/OFF or dimming) of light fixtures. The energy harvesting circuitry transduces ambient light to electricity and uses this energy to charge an energy storage device as well as power a wireless transmitter which can be triggered based on user interaction with an ON/OFF or Dim+/Dim− element. The wireless light switch with energy harvesting circuitry is paired with a wireless receiver circuit which can be connected to a light fixture that is to be controlled by the wireless light switch.

An improvement provided by the wireless light switch is using the energy harvesting circuitry, such as a photovoltaic cell and corresponding circuitry, to charge an energy storage device, such as a battery or capacitor, also included as part of the wireless light switch. The energy stored in the energy storage device is used to provide power for the wireless light switch to wirelessly transmit a turn-on signal to a remote light fixture, such as a lamp in the same room. Light from the remote light fixture is used, along with whatever ambient light is available, to charge the energy storage device using the energy harvesting circuitry.

The wireless light switch is isolated, for example the wireless light switch is not connected to a conventional power grid. To reduce cost and minimize form factor, the energy storage device can be kept small, which therefore limits the size and power storage potential. In some applications, the operation of the wireless light switch is to be maintained over +30 years.

In an aspect, a wireless light switch for controlling a light fixture is disclosed. The wireless light switch comprises an energy harvesting circuit, an energy storage element, a wireless transmitter, and a power and control circuit. The energy harvesting circuit is configured to harvest energy from light external to the wireless light switch. The energy storage element is coupled to the energy harvesting circuit. The power and control circuit is coupled to the energy harvesting circuit, the energy storage element, and the wireless transmitter, wherein the power and control circuit is configured to provide power to the wireless transmitter and to provide control signaling to the wireless transmitter for controlling the light fixture. In some embodiments, the power and control circuit is further configured to monitor a charge level of the energy storage device. In some embodiments, the power and control circuit is further configured to enable or disable the energy harvesting circuit according to the charge level of the energy storage device. In some embodiments, the power and control circuit is further configured to send a control signal to turn ON the light fixture if the charge level of the energy storage device is below a minimum charge threshold level. In some embodiments, the energy harvesting circuit comprises one or more photovoltaic cells. In some embodiments, the energy storage element comprises a rechargeable battery or a capacitor. In some embodiments, the power and control circuit comprises a power conversion circuit. In some embodiments, the power and control circuit comprises a programmable logic circuit. In some embodiments, the power and control circuit comprises a memory for storing a control algorithm implemented by the programmable logic circuit. In some embodiments, the memory further stores a logic table to be implemented by the control algorithm. In some embodiments, the wireless light switch further comprises one or more electrical devices coupled to the power and control circuit. In some embodiments, the one or more electrical devices are each configured to provide data signals to the power and control circuit. In some embodiments, the power and control circuit is configured to provide power to the one or more electrical devices. In some embodiments, each of the one or more electrical devices comprises one of a sensor or a timer.

In another aspect, a lighting system is disclosed that includes a wireless light switch, a light fixture, and a wireless receiver with control circuit. The wireless light switch comprises an energy harvesting circuit, an energy storage element, a wireless transmitter, and a power and control circuit. The energy harvesting circuit is configured to harvest energy from light external to the wireless light switch. The energy storage element is coupled to the energy harvesting circuit. The power and control circuit is coupled to the energy harvesting circuit, the energy storage element, and the wireless transmitter, wherein the power and control circuit is configured to provide power to the wireless transmitter and to provide control signals to the wireless transmitter. The light fixture is remote from the wireless light switch. The wireless receiver with control circuit is coupled to the wireless light switch and the light fixture. The wireless receiver with control circuit is configured to receive the control signals transmitted from the wireless light switch and to control the light fixture according to the received control signals. the power and control circuit is further configured to monitor a charge level of the energy storage device. In some embodiments, the power and control circuit is further configured to enable or disable the energy harvesting circuit according to the charge level of the energy storage device. In some embodiments, the power and control circuit is further configured to send a control signal to turn ON the light fixture if the charge level of the energy storage device is below a minimum charge threshold level. In some embodiments, the energy harvesting circuit comprises one or more photovoltaic cells. In some embodiments, the energy storage element comprises a rechargeable battery or a capacitor. In some embodiments, the power and control circuit comprises a power conversion circuit. In some embodiments, the power and control circuit comprises a programmable logic circuit. In some embodiments, the power and control circuit comprises a memory for storing a control algorithm implemented by the programmable logic circuit. In some embodiments, the memory further stores a logic table to be implemented by the control algorithm. In some embodiments, the wireless light fixture further comprises one or more electrical devices coupled to the power and control circuit. In some embodiments, the one or more electrical devices are each configured to provide data signals to the power and control circuit. In some embodiments, the power and control circuit is configured to provide power to the one or more electrical devices. In some embodiments, each of the one or more electrical devices comprises one of a sensor or a timer.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a wireless light switch. Those of ordinary skill in the art will realize that the following detailed description of the wireless light switch is illustrative only and is not intended to be in any way limiting. Other embodiments of the wireless light switch will readily suggest themselves to such skilled persons having the benefit of this disclosure.

Reference will now be made in detail to implementations of the wireless light switch as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments are directed to a wireless light switch that includes an energy harvesting mechanism, an energy storage element, power and control processing circuitry, a wireless transmitter, and a user interface for controlling a remotely located light fixture. The wireless light switch can include optional powered devices, such as sensors and timers, that are powered by the energy storage element. The wireless light switch is part of a lighting system that includes the light fixture to be controlled and a wireless receiver connected to the light fixture for receiving control signaling transmitted by the wireless light switch. The wireless light switch combines energy harvesting functionality with control processing and wireless control signaling to control a remote light fixture. The energy harvesting functionality enables the wireless light switch to be continuously powered without connection to a remote power supply or need for replacing a depleted battery.

Figure 1:
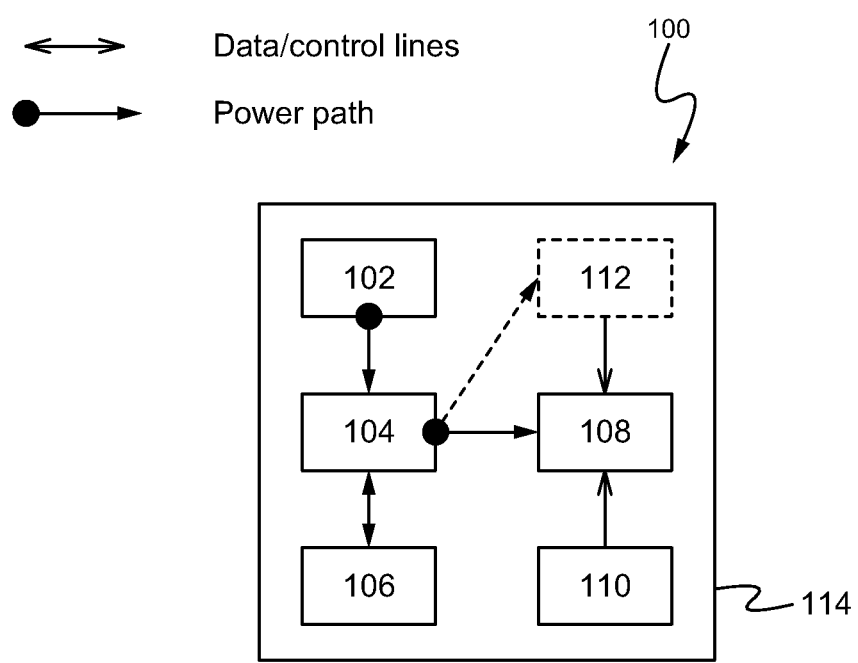
FIG. 1 illustrates a functional block diagram of a wireless light switch according to some embodiments.

FIG. 1 illustrates a functional block diagram of a wireless light switch according to some embodiments. The wireless light switch 100 includes an energy harvesting mechanism 102, power and control circuitry 104, an energy storage element 106, a wireless transmitter 108, a user interface 110, optional electrical devices 112, and an enclosure 114 within which all of the components are housed. The energy harvesting mechanism 102 is configured to transduce ambient light to electrical energy. In some embodiments, the energy harvesting mechanism 102 is one or more photovoltaic cells. A photovoltaic cell is an electrical device that converts the energy of incident light photons into electricity, which can be stored as energy by the energy storage element 106. The photovoltaic cells capture ambient light or artificial light, such as light emitted from an external light fixture in an area proximate the wireless light switch.

The power and control circuitry 104 is configured to charge/discharge the energy storage element 106 and to regulate power provided from the energy storage element 106 to the wireless transmitter 108 and electrical devices 112. The power and control circuitry 104 is also configured to monitor a charge level of the energy storage element 106 and disconnect the energy harvesting mechanism 102 from the energy storage element 106 when the energy storage element 106 reaches a maximum charge capacity. In some embodiments, the charge level of the energy storage element 106 is monitored by monitoring a voltage level of the energy storage element 106 and comparing the monitored voltage level to a set threshold voltage level. In some embodiments, the energy storage element 106 is a rechargeable battery or capacitor, sized based on the power requirements of the wireless transmitter 108, the optional electronic devices 112, and estimated usage rates. The wireless transmitter 108 is configured to send control signals, such as ON/OFF or Dim+/Dim− commands, to a wireless receiver connected to a remote light fixture to be controlled. The control signals are generated by the power and control circuitry 104 based on triggers from the user interface 110, the optional electrical devices 112, or control algorithm implemented within the power and control circuitry 104. In some embodiments, the control algorithm is implement as programmable logic within a programmable integrated circuit device included in the power and control circuitry 104. The user interface 110 is a physical interface for the user, typically implemented as a switch, knob, dial, or the like to initiate a light fixture control command, such as ON/OFF or Dim+/Dim−. The electrical devices 112 can be any sensing or decision making elements that provide signaling to and are used by power and control circuitry 104 to generate and send control signaling, e.g. ON/OFF or dimming, from the wireless light switch via wireless transmitter 108, where these elements need electrical power to operate, the power being provided by the energy harvesting mechanism 102 and the energy storage element 106 via the power and control circuitry 104. Exemplary electrical devices 112 include, but are not limited to, an occupancy sensor, a proximity sensor, and a timer.

Figure 2:
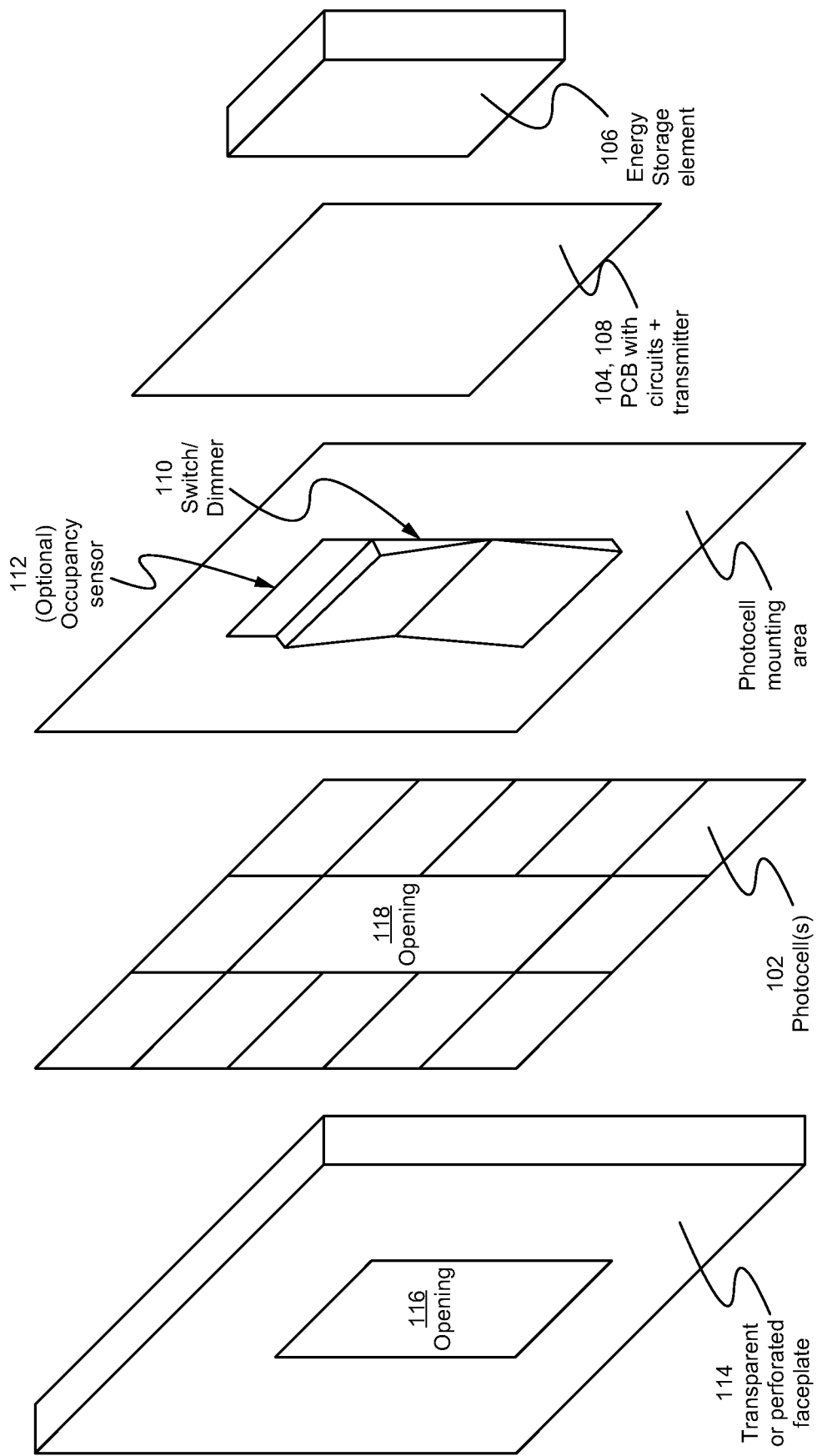
FIG. 2 illustrates an exploded view of an exemplary construction of the wireless light switch of FIG. 1.

FIG. 2 illustrates an exploded view of an exemplary construction of the wireless light switch 100. The enclosure 114 can be implemented as a transparent or perforated faceplate with opening 116 and a backplate (not shown) positioned on a far side (right hand side of FIG. 2) of the energy storage element 106. The energy harvesting mechanism 102 can be implemented as a plurality of photovoltaic cells positioned around an opening 118. The user interface 110 can be implemented as a switch/dimmer that is aligned with the opening 118 and the opening 116. An optional electrical device 112 can be implemented as an occupancy sensor that is also aligned with the opening 118 and the opening 116. The power and control circuit 104 and the wireless transmitter 108 can be implemented as circuitry on a PCB.

The wireless light switch is an isolated device, it is not hard-connected to an external power source. Instead, the wireless light switch includes the localized energy harvesting mechanism and energy storage element. The wireless light switch implements a charging and discharging scheme that enables the wireless light switch to be self-sufficient in terms of energy generation and management, as well as enables control and enablement of electrically functioning devices within the wireless device and externally located control elements physically connected to the light fixture being controlled.

The wireless light switch provides wireless control of an external light fixture without a wired connection between the wireless light switch and the light fixture. The light fixture itself is connected to a main power distribution system, such as the light fixture plugged into a wall socket that is part of a main power distribution system or the light fixture is an installed light connected directly to the main power distribution system. The wireless light switch is independent of the standard power supply used by the light fixture. The wireless light switch enables a separate control structure from the standard power supply. The separate control structure enables the wireless light switch to control operation of the light fixture, such as ON/OFF and dimming functionality.

Figure 3:
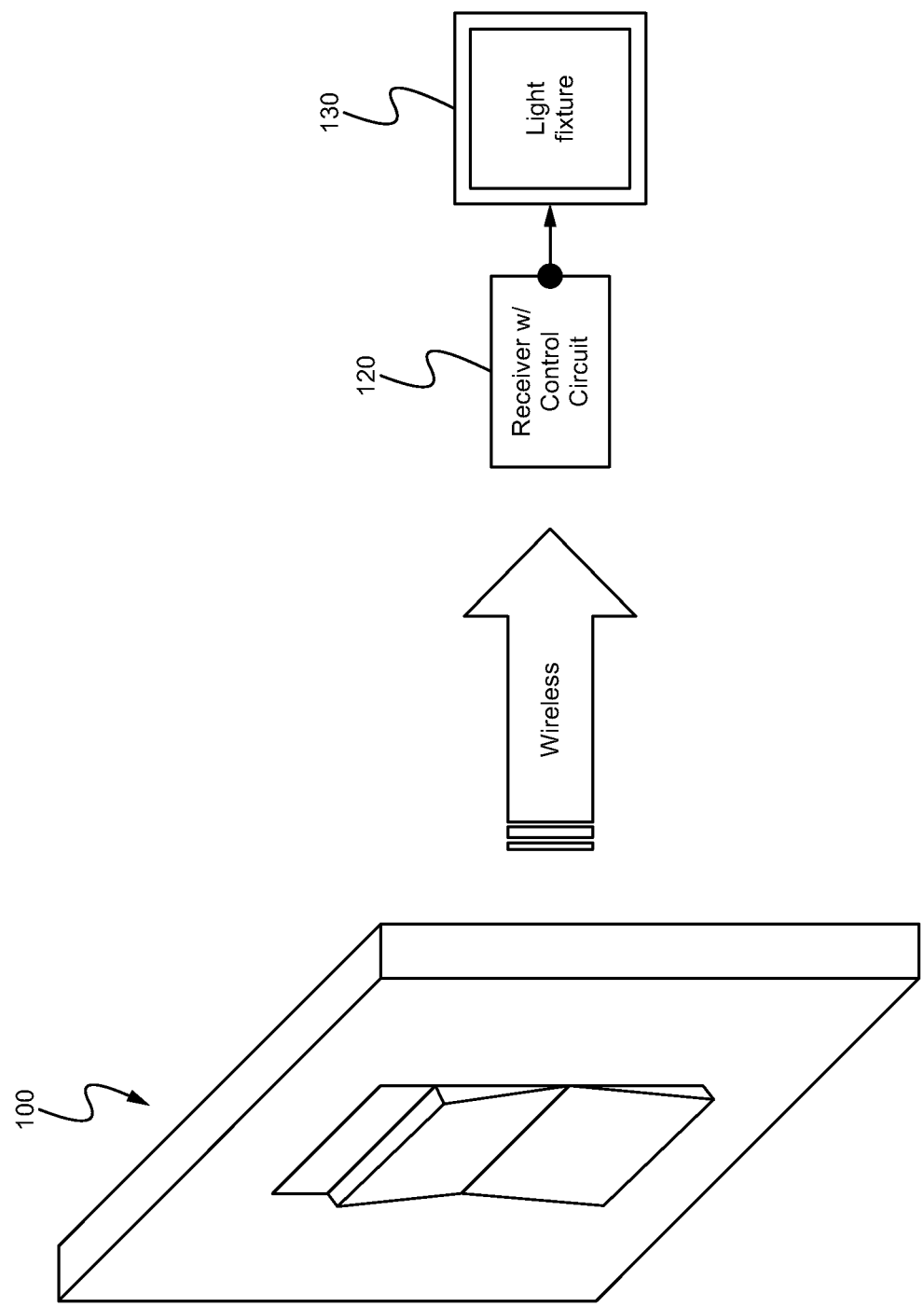
FIG. 3 illustrates a schematic block diagram of the wireless lighting system according to some embodiments.

The wireless light switch is part of a wireless lighting system. FIG. 3 illustrates a schematic block diagram of the wireless lighting system according to some embodiments. The wireless lighting system includes the wireless light switch 100, a wireless receiver with control circuit 120, and a light fixture 130. The wireless light switch 100 includes the wireless transmitter 108 (FIG. 1) for transmitting control signaling, which is received by the wireless receiver with control circuit 120. The wireless receiver with control circuit 120 is physically connected to the light fixture 130. The wireless receiver with control circuit 120 can be either integrated into the light fixture, can be a separate component connected to the light fixture, or can be included in the light bulb of the light fixture. The wireless receiver with control circuit 120 is configured to receive the control signals from the wireless light switch 100 and control the light fixture 130 accordingly, such as turning ON/OFF or dimming.

The wireless receiver is always ON since it is connected, or plugged in, to the main power distribution system same as the light fixture itself. In contrast, the wireless light switch is predominately OFF and therefore does not draw much power. Power can be used by the wireless light switch in bursts, or pulses. An energy pulse is used to power the wireless transmitter for sending a control signal to the wireless receiver and therefore control the light fixture. An energy pulse can also be used to power optional electrical devices, such as sensors, timers, or other types of electrical devices included in the wireless light switch. The energy storage element is sized to store energy sufficient for generating a predetermined number of pulses.

The wireless light switch can be considered to be "locally" powered, i.e. there is no power input to the wireless light switch. This contrasts to conventional devices that require main line power or batteries that need replacing.

The wireless light switch described herein has smart technology enabling increased functionality where smart decisions can be made. The wireless light switch includes control logic circuitry and stored control algorithm for managing the power level within the energy storage device. A critical function of the control logic circuitry and control algorithm is the maintenance of the charge of the energy storage device, which must have enough energy to transmit one or more turn on signals wirelessly to the light fixture. For example, the energy storage level of the energy storage element can be monitored, and if that level drops below a threshold value, the wireless light switch can signal for the light fixture to turn ON, thereby providing light that can be harvested by the energy harvesting element in the wireless light switch. This is especially useful in rooms that do not have access to ambient light. Complicating things are the light levels impinging the energy harvesting mechanism, the degradation of the energy storage device, and the degradation of the energy harvesting mechanism. Such complications can be addressed using the control logic circuitry and stored control algorithm. The control algorithm can be implement as logic within a programmable chip included in the power and control circuit 104.

Functionality implemented using the control logic circuitry and control algorithm can be further expanded according to various implementations of the optional electrical devices 112. For example, the electrical device 112 can be an occupancy sensor built into the wireless light switch, which can be powered off the energy storage element 106. In this way, both the occupancy sensor and the wireless switching element/control are co-located in the wireless light switch and are both powered by the energy harvesting mechanism 102 and energy storage element 106 without need for separate power supplies. As another example, the electrical device 112 can be a timer for automated timing control of the light fixture via the wireless light switch. Again, both the timer and the wireless switching/control are co-located in the wireless light switch and are both powered by the energy harvesting mechanism 102 and energy storage element 106 without need for separate power supplies. As yet another example, the electrical device 112 can be a photovoltaic cell device that detects a level of ambient light, which can be used to turn ON the light fixture (in the case of a low light detection threshold) or turn OFF the light fixture (in case of a high light detection threshold). Inclusion of such electrical devices 112 within the wireless light switch enables these devices to be continuously/periodically powered. It is understood that the electrical device 112 is not limited to a single device, but can be multiple such electrical devices, of the same or different types.

In some embodiments, manual operation of the wireless light switch, e.g. input via the user interface 110, is disabled to prevent manual turn off of the light fixture until the energy storage device is sufficiently charged. Upon reaching a charge level that is sufficient to maintain operation, the wireless light switch can then turn off the light fixture (if there are not any occupants in the room at the time). The wireless light switch can include an occupancy sensor. If there is no-occupancy sensed, the wireless light switch can be configured for a soft turn off of the light fixture, meaning that the light fixture will dim slowly and then turn off. The energy storage device can be connected to or disconnected from the energy harvesting circuit, depending upon the state of charge of the energy storage device.

The design of the wireless light switch considers how large of an energy storage element to use, how efficiently can light be harvested for energy (which speaks to the design of the energy harvesting mechanism), and the use case, i.e. how is the wireless light switch going to be used (can turn the electrical devices 112 ON or OFF depending on the power currently available in the energy storage element 106). At a minimum, the energy storage element 106 needs to include sufficient energy to turn ON the light fixture (e.g. one energy pulse) so that if this minimum threshold is reached the wireless light switch can self-charge in the sense that it can signal the light fixture to turn ON to harvest energy. Such a charge use cycle can be implemented using the control algorithm within the control logic of the wireless light switch, e.g. 104/108. The control algorithm enables the wireless light switch to monitor the energy level of the energy storage element 106, and if it drops to a minimum threshold value, then a control signal is transmitted to the light fixture to turn ON, thereby enabling the wireless light switch to harvest energy and increase the stored energy level. Similarly, the light fixture can be turned OFF by control signaling transmitted from the wireless light switch when the monitored energy level of the energy storage element 106 exceeds a second threshold level. This later case can be further expanded using the occupancy sensor 112, where the light fixture would not be turned OFF automatically, even upon the energy level exceeding the second threshold level, if the occupancy sensor 112 detects a presence in the room. In general, the control algorithm can define operations to be implemented according to a logic table that lists specific control signals (turn ON or OFF light fixture, Dim+ or Dim− the light fixture, turn ON or OFF specific electrical devices 112, turn ON or OFF energy harvesting mechanism 102, etc.) to be generated in response to specific device signals (from electrical devices 112), monitored energy storage levels, defined energy storage threshold levels, and user input controls (user activation of the wireless light switch, e.g. ON or OFF or dimming).

The control logic circuitry and control algorithm can be configured to utilize a logic table, or threshold table, for determining various control functionality, such as when to enable/disable charging of the energy storage device. For example, when the charge level of the energy storage device is below a certain level, then the wireless light switch turns on the light fixture (for a minimum amount of time) in order to charge itself up, so as not to fall below a charge level where there is insufficient power to operate. The following shows some entries from an exemplary logic table:

| Scenario ID | Source Available | Energy Storage Full | Potential Action(s) by Power Circuitry |
|---|---|---|---|
| KS001 | Yes | Yes | [104] breaks the circuit to [102] by either decoupling or in the case of a PV [102] setting the operating voltage of [102] such that there is no power flow about the inherent auxiliary power (i.e. vampire loads) require to sustain the device in a 'sleep' state. |
| KS002 | YES | NO | [104] enables [102] and in the case of a PV [102] dynamics controls the operating voltage of [102] such that the power produced satisfies the charge rate thresholds for [106] |
| KS003 | NO | YES | Normal operation where [104] allows for [106] to act as a current source when [108] is triggered due to user action on [110]. This trigger may be [104] providing a power path to [106] |
| KS004 | NO | NO | -Where the State of Charge is above a specific threshold of discharge limitation: operation shall be the same as KS001 -Where State of Charge is near/below a specific threshold of discharge limitation: when there is a PV [102] then [108] may be triggered without [110] to effectively turn on the ambient lights for a period of time enough to charge [106] to a suitable state. At this point [108] may be triggered again, without [110] to turn off the ambient lights. |

It is understood that the logic table can be greatly expanded to define any of the control functionality described herein.

The wireless light switch can be configured to operate in a variety of different operating modes. Each mode has a minimum charge level, or threshold level, of the energy storage device that needs to be maintained. As such, the minimum charge level will be different depending upon which mode the wireless light switch is set to operate. If the actual charge level of the energy storage device falls below the threshold level, then the wireless light switch is configured to automatically turn ON the light fixture. In an exemplary application, there can be three different operating modes: 1) Switching function only=this function must be maintained at all cost. Threshold level is defined as Ts. 2) Switching function+Sensor(s) function=these functions are maintained only if the charge level is greater than threshold level Tss (which is higher than Ts). 3) Switching function+Sensor(s) function+Connectivity=these functions are maintained only if the charge level is greater than threshold level Tc (which is higher than Tss).

Various charging protocols also can be established. For example, if the current charge level is such that the threshold level Ts (lowest power consumption mode) cannot be maintained for more than say 72 hours, then the wireless light switch turns ON the light fixture to power itself up. As another example, the highest threshold level Tc can represent a full charge, which is when the energy harvesting circuitry disengages. At any charge level lower than that, the energy harvesting circuitry is on.

In some embodiments, 1 hour of incident light is sufficient to keep the energy storage device charged at any level, because the power balance of on-off switching matches that of the energy provided by the light fixture. It is understood that the energy harvesting mechanism and energy storage element can be alternatively designed to meet different energy charging specifications. By way of example, if the wireless light switch is set to operate in the first operating mode (switching function only), then a charge level of 200 mAH is more than enough to run the wireless light switch for a year. In this case, the threshold level can be set to 20 mAH. If the charge level drops below 20 mAH, then the wireless light switch will turn ON the light fixture so the energy storage device can maintain at least the threshold level of 20 mAH.

The present application has been described in terms of specific embodiments incorporating details to facilitate the understanding of the principles of construction and operation of the wireless light switch. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A wireless light switch for controlling a light fixture, the wireless light switch comprising:
   a. an energy harvesting circuit configured to harvest energy from light external to the wireless light switch;
   b. an energy storage element coupled to the energy harvesting circuit;
   c. a wireless transmitter; and
   d. a power and control circuit coupled to the energy harvesting circuit, the energy storage element, and the wireless transmitter, wherein the power and control circuit is configured to provide power to the wireless transmitter and to provide control signaling to the wireless transmitter for controlling the light fixture.

2. The wireless light switch of claim 1 wherein the power and control circuit is further configured to monitor a charge level of the energy storage element.

3. The wireless light switch of claim 2 wherein the power and control circuit is further configured to connect or disconnect the energy harvesting circuit from the energy storage element according to the charge level of the energy storage element.

4. The wireless light switch of claim 2 wherein the power and control circuit is further configured to send a control signal to turn ON the light fixture if the charge level of the energy storage element is below a minimum charge threshold level.

5. The wireless light switch of claim 1 wherein the energy harvesting circuit comprises one or more photovoltaic cells.

6. The wireless light switch of claim 1 wherein the energy storage element comprises a rechargeable battery or a capacitor.

7. The wireless light switch of claim 1 wherein the power and control circuit comprises a power conversion circuit.

8. The wireless light switch of claim 1 wherein the power and control circuit comprises a programmable logic circuit.

9. The wireless light switch of claim 8 wherein the power and control circuit comprises a memory for storing a control algorithm implemented by the programmable logic circuit.

10. The wireless light switch of claim 9 wherein the memory further stores a logic table to be implemented by the control algorithm.

11. The wireless light switch of claim 1 further comprising one or more electrical devices coupled to the power and control circuit.

12. The wireless light switch of claim 11 wherein the one or more electrical devices are each configured to provide data signals to the power and control circuit.

13. The wireless light switch of claim 12 wherein the power and control circuit is configured to provide power to the one or more electrical devices.

14. The wireless light switch of claim 11 wherein each of the one or more electrical devices comprises one of a sensor or a timer.

15. A lighting system comprising:
   a. a wireless light switch comprising:
      I. an energy harvesting circuit configured to harvest energy from light external to the wireless light switch;
      ii. an energy storage element coupled to the energy harvesting circuit;
      iii. a wireless transmitter; and
      iv. a power and control circuit coupled to the energy harvesting circuit, the energy storage element, and the wireless transmitter, wherein the power and control circuit is configured to provide power to the wireless transmitter and to provide control signals to the wireless transmitter;
   b. a light fixture remote from the wireless light switch; and
   c. a wireless receiver with control circuit coupled to the wireless light switch and the light fixture, wherein the wireless receiver with control circuit is configured to receive the control signals transmitted from the wireless light switch and to control the light fixture according to the received control signals.

16. The lighting system of claim 15 wherein the power and control circuit is further configured to monitor a charge level of the energy storage element.

17. The lighting system of claim 16 wherein the power and control circuit is further configured to connect or disconnect the energy harvesting circuit from the energy storage element according to the charge level of the energy storage element.

18. The lighting system of claim 16 wherein the power and control circuit is further configured to send a control signal to turn ON the light fixture if the charge level of the energy storage element is below a minimum charge threshold level.

19. The lighting system of claim 15 wherein the energy harvesting circuit comprises one or more photovoltaic cells.

20. The lighting system of claim 15 wherein the energy storage element comprises a rechargeable battery or a capacitor.

21. The lighting system of claim 15 wherein the power and control circuit comprises a power conversion circuit.

22. The lighting system of claim 15 wherein the power and control circuit comprises a programmable logic circuit.

23. The lighting system of claim 22 wherein the power and control circuit comprises a memory for storing a control algorithm implemented by the programmable logic circuit.

24. The lighting system of claim 23 wherein the memory further stores a logic table to be implemented by the control algorithm.

25. The lighting system of claim 15 further comprising one or more electrical devices coupled to the power and control circuit.

26. The lighting system of claim 25 wherein the one or more electrical devices are each configured to provide data signals to the power and control circuit.

27. The lighting system of claim 26 wherein the power and control circuit is configured to provide power to the one or more electrical devices.

28. The lighting system of claim 25 wherein each of the one or more electrical devices comprises one of a sensor or a timer.

* * * * *